United States Patent
Lee

(10) Patent No.: US 8,320,700 B2
(45) Date of Patent: Nov. 27, 2012

(54) APPARATUS AND METHOD OF ESTIMATING SCALE RATIO AND NOISE STRENGTH OF ENCODED IMAGE

(75) Inventor: Sangkeun Lee, Seoul (KR)

(73) Assignee: Chun-Ang University Industry—Academy Cooperation Foundation, Seoul (KR)

( * ) Notice: Subject to any disclaimer, the term of this patent is extended or adjusted under 35 U.S.C. 154(b) by 349 days.

(21) Appl. No.: 12/840,630

(22) Filed: Jul. 21, 2010

(65) Prior Publication Data

US 2011/0243466 A1  Oct. 6, 2011

(30) Foreign Application Priority Data

Mar. 30, 2010  (KR) .................. 10-2010-0028406

(51) Int. Cl.
 *G06K 9/40* (2006.01)
(52) U.S. Cl. .................. 382/268; 382/275; 382/254
(58) Field of Classification Search .............. None
 See application file for complete search history.

(56) References Cited

U.S. PATENT DOCUMENTS

| | | | | |
|---|---|---|---|---|
| 2007/0237241 | A1* | 10/2007 | Ha et al. | 375/240.27 |
| 2007/0280552 | A1* | 12/2007 | Lee et al. | 382/268 |
| 2010/0226573 | A1* | 9/2010 | Lertrattanapanich et al. | 382/168 |
| 2011/0249892 | A1* | 10/2011 | Chen | 382/165 |

OTHER PUBLICATIONS

Alan W.-C. Liew, et al. "Blocking artifacts suppression in block-coded images using overcomplete wavelet representation", IEEE Trans. Circuits and System on Video Tech., vol. 14, 2004.*
Liu, S. et al. "Efficient DCT-domain blind measurement and reduction of blocking artifacts", IEEE Trans. Circuits and System for Video Tech., vol. 12, 2002.*

* cited by examiner

*Primary Examiner* — Li Liu
(74) *Attorney, Agent, or Firm* — Ladas & Parry LLP

(57) ABSTRACT

An apparatus and method for estimating scale ratio and noise strength of an encoded image includes an edge detection unit, a projection histogram calculation unit, a distance histogram calculation unit, a scale ratio estimation unit, a block boundary determination unit, and a noise strength estimation unit. Compressed noise, such as a block effect, included in an image can be efficiently reduced without prior information about the image.

17 Claims, 5 Drawing Sheets

FIG. 4
(a)
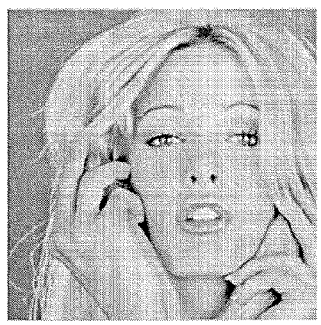
(b)
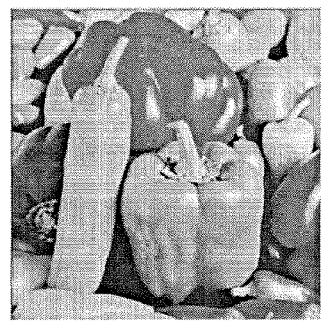
(c)
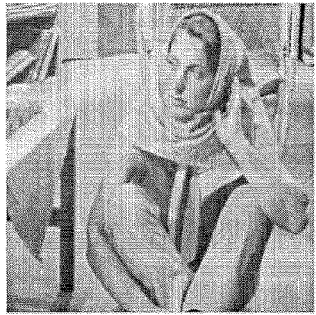
(d)
(e)
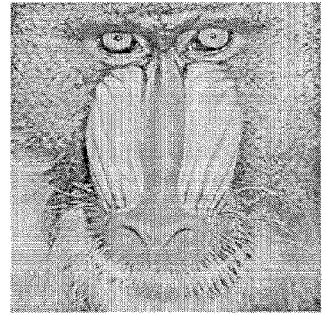
(f)

APPARATUS AND METHOD OF ESTIMATING SCALE RATIO AND NOISE STRENGTH OF ENCODED IMAGE

CROSS-REFERENCE TO RELATED PATENT APPLICATION

This application claims the benefit of Korean Patent Application No. 10-2010-0028406, filed on Mar. 30, 2010, in the Korean Intellectual Property Office, the disclosure of which is incorporated herein in its entirety by reference.

BACKGROUND OF THE INVENTION

1. Field of the Invention

The present invention relates to an apparatus and method of estimating scale ratio and noise strength of an encoded image, and more particularly, to an apparatus and method of determining the position in which a noise reduction filter used to reduce noise, such as a block effect that occurs in an encoded image by performing a block-based image compression technique, is disposed and the strength of the noise reduction filter.

2. Description of the Related Art

In the field of visual communication, improvements in visual quality of an image and a video displayed on a large screen with high resolution are significant. As consumer devices such as digital cameras and video camcorders have been developed, users can easily upload their own clips on a web site, and display manufacturers have tried to display the clips on a relatively large screen.

Meanwhile, discrete cosine transform (DCT)-based coding scheme has been successfully used to compress still or moving images. Digital video contents are processed and encoded using various digital compression techniques so as to overcome a bandwidth limitation in a communication network. Such compressed digital videos include various artifacts that deteriorate the quality of moving pictures and scenes displayed on a screen. The artifacts in the compressed digital videos are referred to as compression noise. Compression noise reduction is an operation of detecting and removing this annoying JPEG or MPEG noise before digital videos are displayed on the screen. However, in most block reduction algorithms, a noise filtering operation is performed assuming that a block offset starts from a first pixel position of an input image. As a result, in the block reduction algorithms, when the block offset is varied, a block effect cannot be accurately reduced.

Many studies have been carried out to remove such artifacts, and they are classified into iterative and non-iterative methods. The iterative methods are based on the theory of projection onto convex sets (POCS) by iterating the projections onto a quantization constraint set and image smoothness constraint set until convergence is achieved. However, iteration-based methods usually impose high computational cost and are difficult to implement in real-time video or image processing.

Non-iterative methods include spatially adaptive filtering schemes that are relatively fast and have low bit rates. Furthermore, block discontinuity cannot be completely reduced using the spatially adaptive filtering schemes. Thus, overcomplete wavelet representation-based image-deblocking algorithms have been suggested. In overcomplete wavelet representation-based image-deblocking algorithms, multi-scale edge analysis can be performed so as to preserve the image details including edges. For example, discontinuity across the neighboring blocks is analyzed in the form of a known quantization step size, and a contaminated image is accurately filtered through several different wavelet scales. Most compression domain approaches that belong to the non-iterative scheme include filtering with DCT or other transforms by directly manipulating its coefficients in a transformed domain. A simple compressed-domain approach using useful information obtained from a decoder has recently shown a good result. Also, a training-based filtering without prior information has been suggested. However, the training-based filtering cannot be performed when an input image is much different from training data.

As described above, most of the approaches have emphasized post-processing using known information, such as a quantization step size. Thus, a technique for estimating noise strength without prior information is required so as to properly apply the deblocking algorithms.

SUMMARY OF THE INVENTION

The present invention provides an apparatus and method of estimating scale ratio and noise strength of an encoded image, whereby compressed noise, such as a block effect, can be accurately and efficiently reduced without prior information about a decoded enlargement image.

The present invention also provides a computer readable recording medium having recorded thereon a program for executing the method of estimating scale ratio and noise strength of an encoded image.

According to an aspect of the present invention, there is provided an apparatus for estimating a scale ratio and noise strength of an encoded image, the apparatus including: an edge detection unit generating an edge map including edge pixels selected based on sizes and consistency of high frequency components extracted from an input image, from among pixels of the input image obtained by encoding and decoding an original image via the block-based image compression technique; a projection histogram calculation unit calculating a horizontal histogram that indicates the number of edge pixels included in each column of the edge map, and a vertical histogram that indicates the number of edge pixels included in each row of the edge map; a distance histogram calculation unit calculating a distance histogram that is represented as the number of frequencies with respect to each of the horizontal histogram and the vertical histogram according to a size of a column distance that is a distance between two adjacent columns in which the column values are not 0 on a horizontal axis; a scale ratio estimation unit estimating a horizontal scale ratio and a vertical scale ratio of the input image with respect to the original image from the distance histogram calculated from each of the horizontal histogram and the vertical histogram based on the value of the column distance corresponding to the maximum number of frequencies; a block boundary determination unit determining a group including the maximum number of edge pixels from among a plurality of groups obtained by classifying a plurality of columns that constitute the edge map based on the horizontal scale ratio, and a group including the maximum number of edge pixels from among a plurality of groups obtained by classifying a plurality of rows that constitute the edge map based on the vertical scale ratio as a block boundary of the input image; and a noise strength estimation unit estimating strength of noise included in the input image based on edge information calculated from the group determined as the block boundary.

According to another aspect of the present invention, there is provided a method of estimating a scale ratio and noise strength of an encoded image, the method including: generating an edge map including edge pixels selected based on sizes and consistency of high frequency components extracted from an input image, from among pixels of the input image obtained by encoding and decoding an original image via the block-based image compression technique; calculating a horizontal histogram that indicates the number of edge pixels included in each column of the edge map, and a vertical histogram that indicates the number of edge pixels included in each row of the edge map; calculating a distance histogram that is represented as the number of frequencies with respect to each of the horizontal histogram and the vertical histogram according to a size of a column distance that is a distance between two adjacent columns in which the column values are not 0 on a horizontal axis; estimating a horizontal scale ratio and a vertical scale ratio of the input image with respect to the original image from the distance histogram calculated from each of the horizontal histogram and the vertical histogram based on the value of the column distance corresponding to the maximum number of frequencies; determining a group including the maximum number of edge pixels from among a plurality of groups obtained by classifying a plurality of columns that constitute the edge map based on the horizontal scale ratio, and a group including the maximum number of edge pixels from among a plurality of groups obtained by classifying a plurality of rows that constitute the edge map based on the vertical scale ratio as a block boundary of the input image; and estimating strength of noise included in the input image based on edge information calculated from the group determined as the block boundary.

BRIEF DESCRIPTION OF THE DRAWINGS

The above and other features and advantages of the present invention will become more apparent by describing in detail exemplary embodiments thereof with reference to the attached drawings in which:

FIG. 4 is six test images used in experiments for evaluating the performance of the apparatus of FIG. 1;

DETAILED DESCRIPTION OF THE INVENTION

Hereinafter, the present invention will be described in detail by explaining exemplary embodiments of the invention with reference to the attached drawings.

Figure 1:
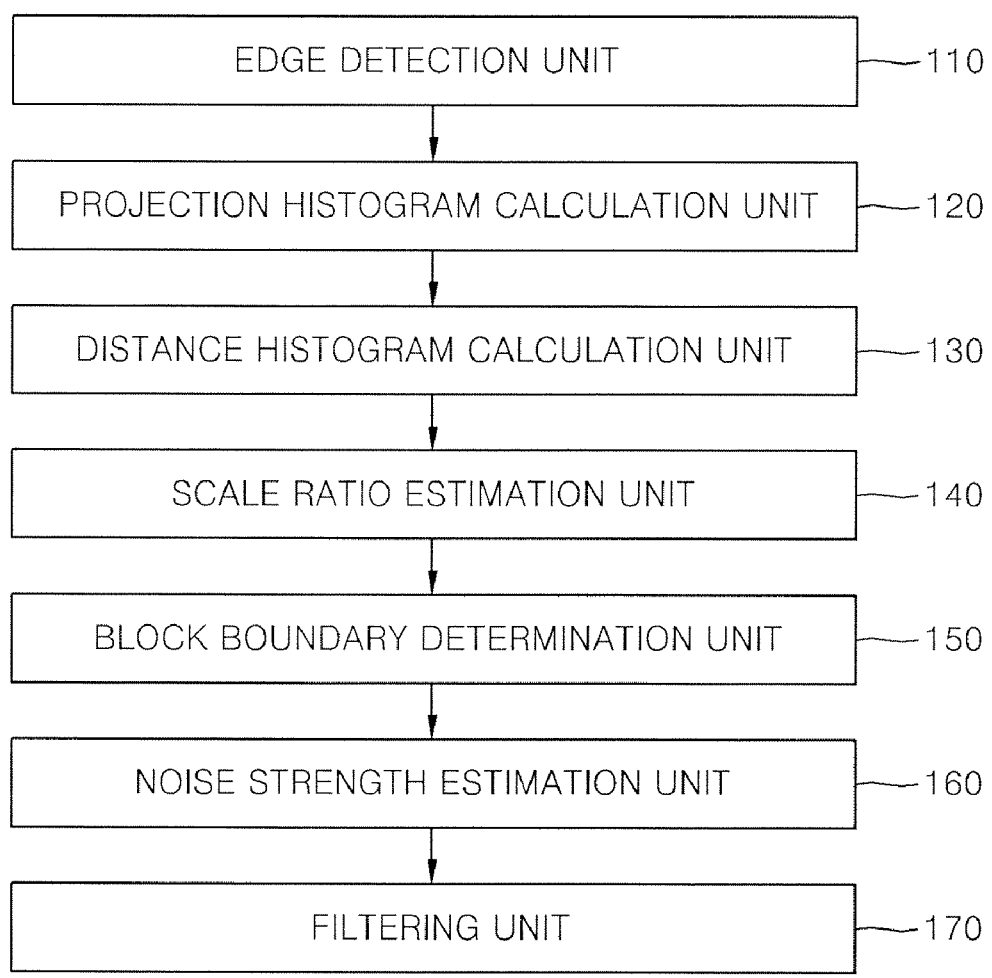
FIG. 1 is a block diagram of an apparatus for estimating scale ratio and noise strength of an encoded image, according to an embodiment of the present invention.

FIG. 1 is a block diagram of an apparatus for estimating scale ratio and noise strength of an encoded image, according to an embodiment of the present invention.

Referring to FIG. 1, the apparatus for estimating a scale ratio and noise strength of an encoded image according to the current embodiment of the present invention includes an edge detection unit 110, a projection histogram calculation unit 120, a distance histogram calculation unit 130, a scale ratio estimation unit 140, a block boundary determination unit 150, a noise strength estimation unit 160, and a filtering unit 170.

Hereinafter, after explaining a conventional image compression method briefly, the function of each of elements of the apparatus for estimating scale ratio and noise strength of an encoded image of FIG. 1 will be described in detail.

JPEG image coding standard may be summarized as discrete cosine transform (DCT)-based image compression. The basic idea of JPEG image coding is easily extended to other DCT-based image and video compression schemes including MPEG and H.26X. An image is divided into a set of tiles or blocks, and each of the tiles or blocks has an 8×8 pixel arrangement. Next, each of the blocks is transformed into a spatial frequency domain via a forward DCT which is defined for each pixel x(i,j) of the 8×8 block as Equation 1:

$$X(u, v) = \frac{1}{4}c(u)c(v)\sum_{i=0}^{7}\sum_{j=0}^{7}\cos\frac{(2i+1)u\pi}{16}\cos\frac{(2j+1)v\pi}{16}x(i, j), \quad (1)$$

$$\text{for } u, v = 0, \ldots, 7,$$

where c(·) is defined using Equation 2:

$$c(\eta) = \begin{cases} \frac{1}{\sqrt{2}}, & \text{for } \eta = 0 \\ 1, & \text{otherwise} \end{cases} \quad (2)$$

After DCT, 64 DCT coefficients that constitute the 8×8 block are quantized. In detail, each of the 64 DCT coefficients is divided by corresponding quantization parameter (quantization step) and then rounded to the nearest integer. Finally, quantized DCT coefficients are aligned in the order of zigzag scanning and entropy-encoded.

In order to reconstruct an original image during a decoding operation, a compressed image is entropy-decoded and is dequantized by point-to-point multiplication with quantization parameters and then is inverse-transformed using inverse DCT (IDCT). In this case, IDCT is expressed using Equation 3:

$$x(i, j) = \frac{1}{4}\sum_{u=0}^{7}\sum_{v=0}^{7}c(u)c(v)\cos\frac{(2i+1)u\pi}{16}\cos\frac{(2j+1)v\pi}{16}X(u, v), \quad (3)$$

$$\text{for } u, v = 0, \ldots, 7.$$

As described above, each block of the image is reconstructed from a weighted sum of DCT coefficients corresponding to the specific spatial frequency contributions.

The apparatus for estimating scale ratio and noise strength of an encoded image of FIG. 1 has a structure in which noise, such as a block effect, that occurs in a block boundary of the input image obtained by a block-based image compression technique described above can be efficiently reduced.

The edge detection unit 110 generates an edge map including edge pixels selected based on the sizes and consistency of high frequency components extracted from an input image, from among pixels of the input image obtained by encoding and decoding the original image via the block-based image compression technique.

When the input image has the size of $N_c \times N_r$, in order to estimate the scale ratio of the input image, it is assumed that the block boundaries are noise components residing across the neighboring blocks. Also, it is assumed that the original image is $x_o$ and an input image obtained by encoding the original image is $\hat{x}$. Estimation of the scale ratio of the input image is to detect noise components included in a distorted image $\hat{x}$ and to reduce them.

The edge detection unit 110 extracts high frequency components from the input image and selects edge pixels that are estimated as belonging to the edges, i.e., the block boundaries of the input image, from among pixels that constitute the input image based on the extracted high frequency components.

In order to extract the high frequency components from the input image, all conventional methods may be used. In an embodiment, the high frequency components of the input image can be extracted using a Laplacian mask that is a second-order differential operator, as shown in Equation 4. The Laplacian mask is used to calculate a zero-crossing point so as to detect the block boundary and noise.

$$G_v(i, j) = \left[\frac{\partial^2 \hat{x}(i, j)}{\partial j^2}\right] = \hat{x} \otimes M_v, \quad (4)$$

where $G_v(i,j)$ is a value of a high frequency component corresponding to a position (i,j) of the input image, and $\otimes$ is a convolution operator, and $M_v$ is a mask having the size of 3×3 that is defined as the following value:

$$M_v = \begin{bmatrix} -1 & 2 & -1 \\ -2 & 4 & -2 \\ -1 & 2 & -1 \end{bmatrix}$$

When the high frequency components are extracted from the input image in this manner, the edge detection unit 110 selects edge pixels that constitute an edge map, from among a plurality of pixels of the input image, and a criterion for selecting the edge pixels is the sizes and consistency of the high frequency components extracted from the input image.

In detail, constraints expressed by Equation 5 should be satisfied so that the pixel in the position (i,j) of the input image may be determined as an edge pixel $p_{ij}$ that belongs to the edge map P.

$$P = \{p_{i,j}: \alpha < G_{|v|}(p_{i,j}) < \beta \text{ and } \text{sign}(G_v(p_{i,j-1})) \neq \text{sign}(G_v(p_{i+1,j-1})) \text{ and sign}(G_v(p_{i,j})) \neq \text{sign}(G_v(p_{i+1,j})) \text{ and sign}(G_v(p_{i,j+1})) \neq \text{sign}(G_v(p_{i+1,j+1}))\} \quad (5),$$

where $G_{|v|}(p_{i,j})$ is the size of the high frequency component corresponding to the position (i,j) of the input image, and sign (·) represents the sign of a given value. Also, values of $\alpha$ and $\beta$ are determined in advance and may be varied according to settings.

Summarizing the process of determining the edge pixel expressed as Equation 5, a pixel in which the size of the high frequency component corresponding to the position (i,j) of the input image belongs to a predetermined range $R=[\alpha\ \beta]$ and the sign of the high frequency component with respect to vertical pixels centering on the position (i,j) is different from the sign of the high frequency component with respect to adjacent vertical pixels and which is in the position (i,j) of the input image is determined as the edge pixel and is included in the edge map P.

The projection histogram calculation unit 120 calculates a horizontal histogram that indicates the number of edge pixels included in each column of the edge map P, and a vertical histogram that indicates the number of edge pixels included in each row of the edge map P.

In detail, the projection histogram calculation unit 120 indicates the number of edge pixels included in each column of the edge map P as the horizontal histogram while scanning the edge map P obtained by the edge detection unit 110 in a horizontal direction, and indicates the number of edge pixels included in each row of the edge map P as the vertical histogram while scanning the edge map P in a vertical direction. Calculating of the number of edge pixels included in each column or each row of the edge map P is to determine the block boundaries in the input image.

Also, in order to exclude a column or row in which less than a predetermined number of edge pixels are included, from a consideration target for determining the block boundaries, a column or row in which more than a predetermined number of edge pixels are included, i.e., only a column having larger than a predetermined size is left from the horizontal or vertical histogram, and values of the remaining columns may be determined as 0. For example, a value of each column of the horizontal histogram may be rectified using Equation 6:

$$h_c(j)' = \max(0, h_c(j) - \overline{h}_c) \quad (6)$$

$$\overline{h}_c = \frac{1}{N_c}\sum_{i=0}^{N_c} h_c(i),$$

where $h_c(j)'$ is a rectified value of a j-th column in the horizontal histogram, and $h_c(j)$ is a value of the j-th column in the horizontal histogram, and $N_c$ is the number of columns of the horizontal histogram, i.e., the number of columns of the input image.

As shown in Equation 6, a value of a column having a smaller value than an average of values of columns of the horizontal histogram, from among values of columns of the horizontal histogram is rectified to 0. The correction of the value of the horizontal histogram may be applied to the vertical histogram in the same manner. In this way, a position in which a relatively small number of edge pixels are included and there is no probability that the edge pixels may correspond to the block boundaries, is excluded from the potential block boundaries so that accuracy and efficiency of the operation of determining the block boundaries are improved.

When the horizontal histogram and the vertical histogram (or horizontal and vertical histograms each having a rectified value) are obtained by scanning the edge map P in horizontal and vertical directions, the distance histogram calculation unit 130 calculates a distance histogram that is represented as the number of frequencies with respect to each of the horizontal histogram and the vertical histogram according to the size of a column distance that is a distance between two adjacent columns in which the column values are not 0 on a horizontal axis.

The horizontal axis of the distance histogram represents the size of the column distance that is the distance between two adjacent columns on the horizontal axis in the horizontal and vertical histograms, i.e., the distance between adjacent columns or rows each having edge pixels in the edge map P. The vertical axis of the distance histogram represents the number of frequencies of the column distance having the same size while the horizontal and vertical histograms are scanned from a starting point.

Figure 2:
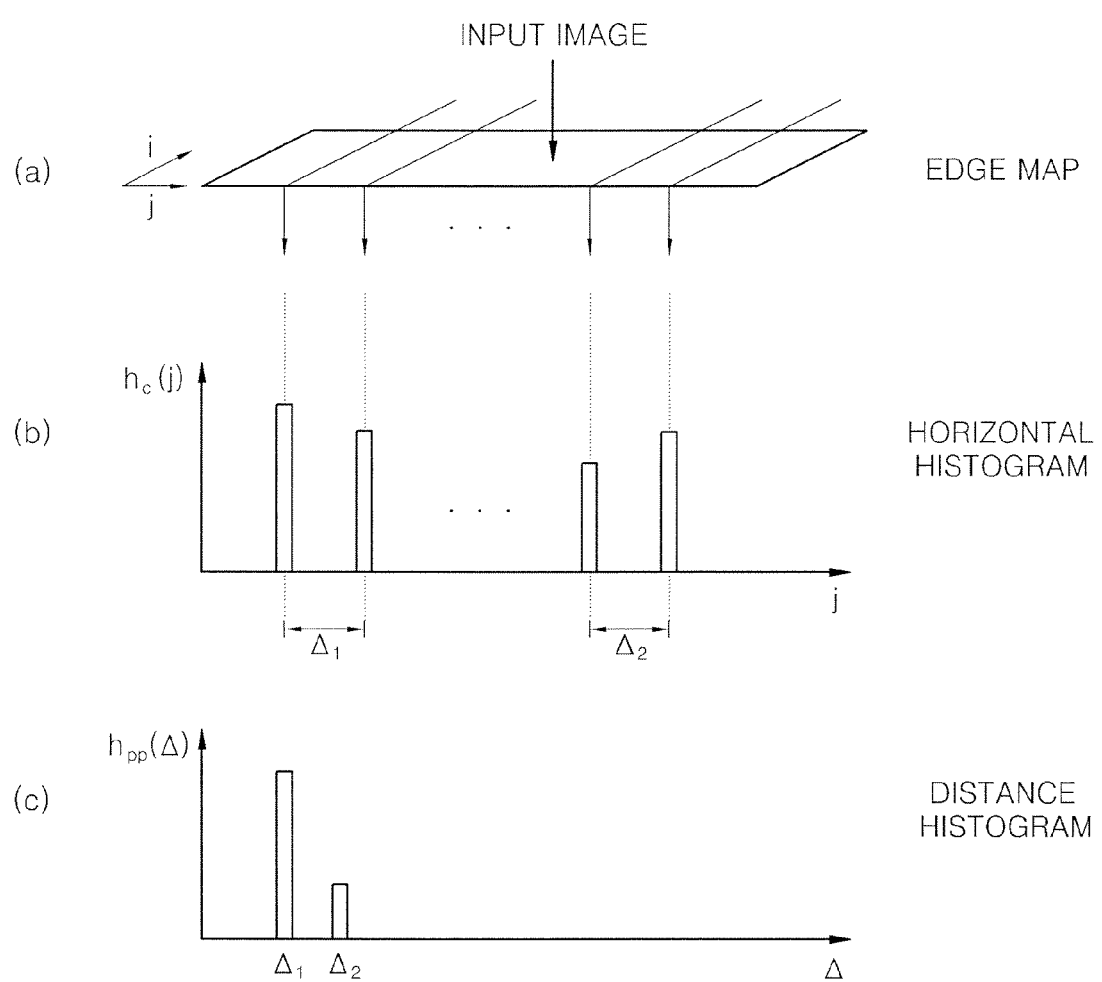
FIG. 2 illustrates an example in which an edge map, a horizontal histogram, and a distance histogram are sequentially generated from an input image.

FIG. 2 illustrates an example in which the edge map P, the horizontal histogram, and the distance histogram are sequentially generated from the input image. The vertical histogram and its distance histogram are also generated in the same process as the process illustrated in FIG. 2.

Referring to FIG. 2, the edge map generation unit 110 generates the edge map P including edge pixels selected from the input image, as illustrated in (a) of FIG. 2. In this regard, the edge map P may be shown in the form of a binary image in which a value of 1 is allocated to positions of the edge pixels and a value of 0 is allocated to the other positions.

As illustrated in (b) of FIG. 2, the projection histogram calculation unit 120 calculates the horizontal histogram that indicates the number of edge pixels included in each of columns of the edge map P, by scanning the edge map P in the horizontal direction. In (b) of FIG. 2, the horizontal axis j represents the number of columns of the edge map P, and the vertical axis $h_c(j)$ represents a value of a j-th column of the horizontal histogram, i.e., the number of edge pixels included in the j-th column of the edge map P. A value of a column corresponding to the number of a column in which the edge pixels are not included is 0, and a value of a column having a smaller value than a predetermined reference value may be rectified to 0 by performing the correction operation described above.

(c) of FIG. 2 illustrates the distance histogram calculated from the horizontal histogram by using the distance histogram calculation unit 130. The distance histogram calculation unit 130 calculates the column distance that is the distance between two adjacent columns on the horizontal axis while scanning the horizontal histogram from the staring point. For example, as illustrated in (b) of FIG. 2, the distance between adjacent columns is calculated as $\Delta_1$ and $\Delta_2$. Also, the distance histogram calculation unit 130 calculates number of times at which the column distance having the same size occurs, i.e., the number of frequencies of each column distance, while calculating the column distance by scanning the horizontal histogram.

When scanning of the horizontal histogram is completed, the distance histogram illustrated in (c) of FIG. 2 can be obtained. In the distance histogram of (c) of FIG. 2, the horizontal axis $\Delta$ represents the value of the column distance, and the vertical axis $h_{p \cdot p}(\Delta)$ represents the number of frequencies corresponding to the value of each column distance. In the example illustrated in (c) of FIG. 2, a column distance having the highest number of frequencies is $\Delta_1$, and a column distance having the second highest number of frequencies is $\Delta_2$. Also, in (c) of FIG. 2, column distances having two different sizes are obtained as a result of scanning the horizontal histogram of (b) of FIG. 2. However, there may be the case where only a column distance having one size occurs in the distance histogram, i.e., the case where the distance between two adjacent columns in the horizontal histogram is constant, and furthermore, there may be the case where three or more column distances occur.

The scale ratio estimation unit 140 estimates a horizontal scale ratio and a vertical scale ratio of the input image with respect to an original image from the distance histogram calculated from each of the horizontal histogram and the vertical histogram based on the value of the column distance corresponding to the maximum number of frequencies.

The horizontal scale ratio and the vertical scale ratio are estimated in the same way. Thus, hereinafter, both the horizontal scale ratio and the vertical scale ratio are referred to as a scale ratio, and an operation of estimating the scale ratio from the distance histogram will be described. In other words, the horizontal scale ratio can be estimated from the distance histogram calculated from the horizontal histogram by using the following method, and the Vertical scale ratio can be estimated from the distance histogram calculated from the vertical histogram by using the following method. Also, estimation of the scale ratio may be varied according to the number of columns included in the distance histogram.

When only one column is included in the distance histogram, i.e., when a column distance obtained by scanning the horizontal or vertical histogram is one, the scale ratio of the input image with respect to the original image is estimated as a value obtained by dividing the value of the column distance corresponding to the maximum number of frequencies by 8, i.e., as $$r = \frac{\Delta_{peak}}{8}.$$

Here, r is a scale ratio, and $\Delta_{peak}$ is a value of the column distance corresponding to the maximum number of frequencies in the distance histogram. Also, the reason why the scale ratio is estimated by dividing the value of the column distance by 8 is that the size of a unit block in the block-based image compression technique is 8×8 (pixel).

Meanwhile, when a plurality of columns are included in the distance histogram, the value of the column distance corresponding to the maximum number of frequencies, and the value of the column distance corresponding to the second highest number of frequencies are used to estimate the scale ratio. In other words, when two columns are included in the distance histogram, the scale ratio of the input image is estimated using Equation 7:

$$r = \frac{\Delta'_{peak}}{8} \quad (7)$$

$$\Delta'_{peak} = t \times (\Delta_{peak-1}) + (1-t) \times \Delta_{peak}$$

$$t = \frac{h_{p \cdot p}(\Delta_{peak-1})}{h_{p \cdot p}(\Delta_{peak})},$$

where $\Delta_{peak-1}$ is a value of the column distance corresponding to the second highest number of frequencies in the distance histogram, and $h_{p \cdot p}(\Delta\Delta_{peak-1})$ is the second highest number of frequencies in the distance histogram, and $h_{p \cdot p}(\Delta_{peak})$ is the highest number of frequencies in the distance histogram.

In this manner, when two or more column distances occur in the distance histogram, i.e., when the distance between adjacent columns in the horizontal or vertical histogram is not constant, accuracy of estimation of the scale ratio can be improved by using a weighted sum of values of column distances, as shown in Equation 7.

Next, the block boundary determination unit 150 determines a group including the maximum number of edge pixels from among a plurality of groups obtained by classifying a plurality of columns that constitute the edge map P based on the horizontal scale ratio, and a group including the maximum number of edge pixels from among a plurality of groups obtained by classifying a plurality of rows that constitute the edge map P based on the vertical scale ratio as a block boundary of the input image.

In order to reduce noise efficiently while retaining detailed information about the input image when the noise reduction filter, such as a deblocking filter, is applied to the input image, the position of the noise reduction filter and its strength should be adaptively adjusted. Thus, the block boundary determination unit 150 determines the position of the input image that corresponds to the block boundary, thereby allowing the noise reduction filter to be applied to the position of the block boundary. Strength of the noise reduction filter is determined depending on strength of noise included in the position of the block boundary. Thus, the noise strength estimation unit 160 that will be described later estimates the strength of noise included in the input image.

The block boundary of the input image is determined using the edge map P generated by the edge detection unit 110 and the scale ratio estimated by the scale ratio estimation unit 140. In detail, the block boundary determination unit 150 determines a vertical block boundary of the input image from the edge map P by using the horizontal scale ratio and determines a horizontal block boundary of the input image from the edge map P by using the vertical scale ratio. Since the vertical block boundary and the horizontal block boundary are determined in the same way, hereinafter, an operation of determining the vertical block boundary by using the horizontal scale ratio will be described in more detail.

The block boundary determination unit 150 classifies a plurality of columns that constitute the edge map P into eight groups based on the horizontal scale ratio of the input image. In detail, indexes from 0 to 7 are allocated to each of the plurality of columns of the edge map P according to classification criteria of the groups, and values of the indexes allocated to each of the columns are determined using Equation 8:

$$c = (\text{round}(j/r)) \% 8 \qquad (8),$$

where c is a value of an index allocated to each column of the edge map P, and round (·) approximates the input value to the nearest integer, and j is the number of columns of the edge map P, and r is a horizontal scale ratio, and % is a modulo operator.

When the index is allocated to each column of the edge map P by using Equation 8, columns having the same index value belong to the same group. The block boundary determination unit 150 determines a group including the maximum number of edge pixels from among eight groups as a vertical block boundary. In detail, the position of columns that belong to the group including the maximum number of edge pixels from among a plurality of groups generated by classifying a plurality of columns of the edge map P is determined as the position of the vertical block boundary in the input image. In most cases, a group determined as the vertical block boundary is a group including columns having the same index value of 7. When the operation is applied to determination of the horizontal block boundary, the position of rows that belong to the group including the maximum number of edge pixels from among a plurality of groups generated by classifying a plurality of rows of the edge map P is determined as the position of the horizontal block boundary in the input image.

When the center of the noise reduction filter is disposed in the position of the block boundary determined above, the performance of reducing noise included in the input image can be maximized.

The noise strength estimation unit 160 estimates strength of noise included in the input image based on edge information calculated from the group determined as the block boundary.

The edge information that will now be described is used to establish the position of the block boundary and to estimate strength of noise included in the input image. Parameters that constitute the edge information include an edge count, an edge ratio, and an edge value. The edge information may be calculated from the entire portion of the input image or from each of a plurality of portions of the input image obtained by dividing the input image into the plurality of portions, for example, 3×4 regions having the size of $M_s \times N_s$. The edge information about the regions of the input image is useful when noise, such as a block effect, occurs in parts of the input image.

Also, like in the operation of determining the block boundary, the edge information is calculated in the horizontal and vertical directions, respectively, and is divided into first edge information calculated from a group determined as the vertical block boundary, and second edge information calculated from a group determined as the horizontal block boundary. The first edge information and the second edge information are calculated in the same way. Thus, hereinafter, an operation of calculating the first edge information and an operation of calculating the second edge information will be described as an operation of calculating the edge information.

The edge count from among three parameters that constitute the edge information is represented as the number of edge pixels that belong to the group determined as the block boundary in the input image. In other words, the edge count may be obtained using Equation 9, and if the value of the edge count is large, a relatively large amount of edge features are present in the block boundary.

$$h_{cnt} = h_v(C_{max}) \qquad (9),$$

where $h_{cnt}$ is an edge count, and $h_v(C_{max})$ is the number of edge pixels that belong to the group determined as the block boundary.

Information about the group including the second highest number of edge pixels from among the plurality of groups obtained by classifying a plurality of columns or rows of the edge map by using the block boundary determination unit 150 is used to calculate the edge ratio. The edge ratio is calculated using Equation 10:

$$h_{ratio} = \frac{h_v(C_{2nd})}{h_v(C_{max})}, \qquad (10)$$

where $h_{ratio}$ is an edge ratio, and $h_v(C_{2nd})$ is the number of edge pixels that belong to the group including the second highest number of edge pixels from among a plurality of groups obtained by the block boundary determination unit 150, and $h_v(C_{max})$ is the number of edge pixels that belong to the group determined as the block boundary.

In detail, as shown in Equation 10, the edge ratio of the first edge information is calculated using the ratio of the number of edge pixels that belong to the group including the second highest number of edge pixels with respect to the number of edge pixels that belong to the group determined as the vertical block boundary from among a plurality of groups obtained by classifying a plurality of columns of the edge map. Also, the edge ratio of the second edge information is calculated using the ratio of the number of edge pixels that belong to the group including the second highest number of edge pixels with respect to the number of edge pixels that belong to the group determined as the horizontal block boundary from among a plurality of groups obtained by classifying a plurality of rows of the edge map.

The edge ratio refers to the presence and size of the block effect. If the edge ratio is 75% or more, an ignorable block effect occurs in the block boundary. Meanwhile, as the value of the edge ratio decreases, a relatively large amount of the block effect occurs in the entire block boundary. Thus, application of the noise reduction filter and its strength can be determined depending on the size of the edge ratio.

The edge value is an average of sizes of edge pixels that belong to the group determined as the block boundary and is calculated using Equation 11:

$$h_{val} = \frac{h_v^{mag}(C_{max})}{h_v(C_{max})}, \quad (11)$$

were $h_{val}$ is an edge value, and $h_v^{mag}(C_{max})$ is the sum of high frequency components with respect to edge pixels that belong to the group determined as the block boundary, and $h_v(C_{max})$ is the number of edge pixels that belong to the group determined as the block boundary.

If the edge value is large, a relatively large amount of real edge features of the image compared to noise are included in the block boundary. In such a case, strong filtering operation that smoothes out the block boundary should be avoided. However, when the edge ratio is small, the large edge value means that a strong block effect occurs in the block boundary and a variation in pixel values across the block boundary is large.

Thus, the strength of noise included in the input image may be estimated by combining three parameters of the edge information described above. This also applied to the edge count. The case where, when the edge ratio is small, the large edge count means that a relatively large block effect is present in the block boundary. Also, the case where, when the edge ratio is large, the large edge count means that a relative large amount of edge features are included in the block boundary and the edge features should not be smoothed by the noise reduction filter.

To sum up, the noise strength estimation unit 160 estimates the strength of noise included in the input image by calculating the edge information from the group determined as the block boundary by using the block boundary determination unit 150. In detail, the noise strength estimation unit 160 estimates the strength of noise of a vertical block boundary included in the input image from values of the parameters that constitute the first edge information, by calculating the first edge information from the group determined as the vertical block boundary, and estimates the strength of noise of a horizontal block boundary included in the input image from values of the parameters that constitute the second edge information, by calculating the second edge information from the group determined as the horizontal block boundary. The strength of noise estimated above is used to determine the strength of the noise reduction filter for reducing noise, such as a block effect, from the input image.

Strengths of noise that are respectively estimated from the first edge information and the second edge information may be obtained using Equation 12:

$$Q_{rs} = \left(1 - \lambda_{T_{cnt}^1}^{T_{cnt}^2}(h_{cnt})\right) \cdot \lambda_{T_{ratio}^1}^{T_{ratio}^2}(h_{ratio}) \cdot h_{val}, \quad (12)$$

where $Q_{rs}$ is an estimated noise strength, and $h_{cnt}$ is an edge count, and $h_{ratio}$ is an edge ratio, and $h_{val}$ is an edge value, and a weighted function $\lambda_{\tau_1}^{\tau_2}(\chi)$ having two threshold is defined using Equation 13:

$$\lambda_{\tau_1}^{\tau_2}(\chi) = \begin{cases} 1 & \text{for } \chi < \tau_1 \\ \frac{1}{\tau_2 - \tau_1}(\chi - \tau_1) & \text{for } \tau_1 \le \chi \le \tau_2 , \\ 0 & \text{for } \chi > \tau_2 \end{cases} \quad (13)$$

where $\tau_1$ is a first threshold, and $\tau_2$ is a second threshold. The first threshold and the second threshold with respect to the edge count and the edge ratio are varied according to user's settings and may be defined as proper values by experiments.

As shown in Equations 12 and 13, if the value of the edge count is smaller than the first threshold or the value of the edge ratio is greater than the second threshold, the strength of noise is 0, as described above.

The filtering unit 170 reduces noise included in the input image by applying a block reduction filter having a strength determined based on the strength of noise estimated by the noise strength estimation unit 160 to the position of the block boundary determined by the block boundary determination unit 150.

When the center of the noise reduction filter corresponds to the position of the block boundary, the performance of reducing noise is maximized as described above. The relationship between the estimated noise strength and the strength of the noise reduction filter is shown in Table 1.

TABLE 1

| Edge count | Edge ratio | Edge value | Noise probability (strength of filtering) |
|---|---|---|---|
| High | High | High | Low (weak) |
| High | High | Low | Low (weak) |
| High | Low | High | High (light) |
| High | Low | Low | High (strong) |
| Low | High | High | Low (weak) |
| Low | High | Low | Low (weak) |
| Low | Low | High | High (weak) |
| Low | Low | Low | High (weak) |

As shown in Table 1, when the edge ratio is low, a probability that noise may be included in the block boundary is high, and the strength of filtering is weak if the value of the edge count is small, and if the value of the edge count is high, the strength of filtering is weak or strong according to the edge value.

As described above, the position of the block boundary is determined by estimating the scale ratio of the input image with respect to the original image, and the strength of noise included in the input image is estimated based on the edge information calculated from the block boundary so that accuracy of the noise reduction filter can be improved.

Figure 3:
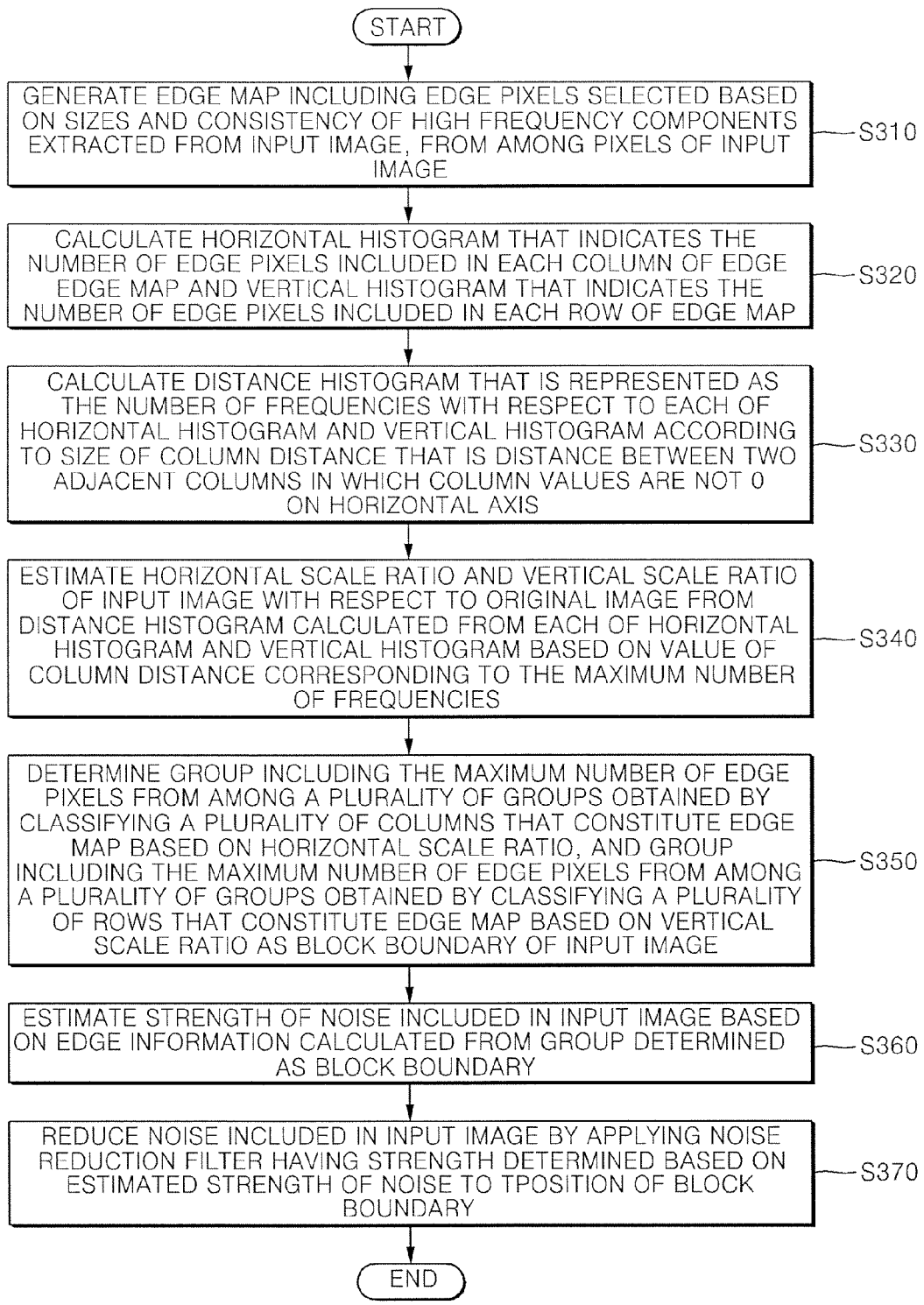
FIG. 3 is a flowchart illustrating a method of estimating scale ratio and noise strength of an encoded image, according to an embodiment of the present invention.

FIG. 3 is a flowchart illustrating a method of estimating scale ratio and noise strength of an encoded image, according to an embodiment of the present invention.

Referring to FIG. 3, in Operation S310, the edge detection unit 110 generates an edge map including edge pixels selected based on the sizes and consistency of high frequency components extracted from an input image, from among pixels of the input image obtained by encoding and decoding the original image via the block-based image compression technique.

In Operation S320, the projection histogram calculation unit 120 calculates a horizontal histogram that indicates the number of edge pixels included in each column of the edge map P and a vertical histogram that indicates the number of edge pixels included in each row of the edge map P. In Operation S330, the distance histogram calculation unit 130 calculates a distance histogram that is represented as the number of frequencies with respect to each of the horizontal histogram and the vertical histogram according to the size of a column that is a distance between two adjacent columns in which the column values are not 0 on a horizontal axis.

In Operation S340, the scale ratio estimation unit 140 estimates a horizontal scale ratio and a vertical scale ratio of the input image with respect to an original image from the distance histogram calculated from each of the horizontal histogram and the vertical histogram based on the value of the column distance corresponding to the maximum number of frequencies.

In Operation S350, the block boundary determination unit 150 determines a group including the maximum number of edge pixels from among a plurality of groups obtained by classifying a plurality of columns that constitute the edge map P based on the horizontal scale ratio, and a group including the maximum number of edge pixels from among a plurality of groups obtained by classifying a plurality of rows that constitute the edge map P based on the vertical scale ratio as a block boundary of the input image. In Operation S360, the noise strength estimation unit 160 estimates strength of noise included in the input image based on edge information calculated from the group determined as the block boundary.

Last, in Operation S370, the filtering unit 170 reduces noise included in the input image by applying a noise reduction filter having a strength determined based on the strength of noise estimated by the noise strength estimation unit 160 to the position of the block boundary determined by the block boundary determination unit 150.

Experiments for evaluating the performance of the apparatus for estimating scale ratio and noise strength of an encoded image of FIG. 1 have been carried out. Six test images used in the experiments are shown in FIG. 4. Relatively low frequency components are included in the images (a) through (e) of FIG. 4, and relatively high frequency components are included in the image (f) of FIG. 4. In the experiments, the range of values of high frequency components for selecting edge pixels is set as R=[4 128] with respect to an 8-bit input image, and thresholds used to estimate the strength of noise of the input image is set as $T_{cnt}=[N_{bbp}/3\ N_{bbp}/2]$ with respect to the edge count and as $T_{ratio}=[51/128\ 110/128]$ with respect to the edge ratio. In this regard, $N_{bbp}$ is the number of all pixels that belong to the group determined as the block boundary and is varied depending on the size of the input image.

Only the luminance component of the input image is used in the experiments, and the result of estimating the scale ratio and the strength of noise is evaluated by a quality factor that indicates the strength of compression.

The quality factor adjusts values of quantization parameters so as to obtain a high compression rate with a relatively small value and is expressed using Equation 14:

$$q_x = \begin{cases} \frac{(100-x)}{50} \cdot q_{50} & \text{if } x > 50 \\ \frac{50}{x} \cdot q_{50} & \text{otherwise} \end{cases} \quad (14)$$

A quantization table $q_{50}$ that is usually used is defined as follows:

$$q_{50} = \begin{vmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{vmatrix}.$$

A first experiment has been carried out so as to evaluate accuracy of estimating the strength of noise. The test images (a) through (f) of FIG. 4 are encoded at various compression ratios, and the present invention is applied to the decoded image so as to estimate the strength of noise. The strength $Q_{rs}$ of noise estimated at different compression ratios $q_x$ is shown in Table 2.

TABLE 2

| Image | | (a) | (b) | (c) | (d) | (e) | (f) | Average |
|---|---|---|---|---|---|---|---|---|
| Quality | 10 | 28.7 | 27.3 | 27.8 | 25.0 | 23.6 | 22.5 | 25.8 |
| factor | 15 | 22.9 | 22.6 | 22.8 | 22.3 | 21.0 | 20.8 | 22.1 |
| $q_x$(%) | 20 | 20.6 | 21.0 | 21.0 | 20.5 | 19.7 | 19.0 | 20.3 |
| | 25 | 18.2 | 18.9 | 18.7 | 18.7 | 17.3 | 17.8 | 18.2 |
| | 30 | 17.3 | 18.7 | 18.0 | 17.6 | 15.7 | 15.5 | 17.1 |
| | 35 | 16.4 | 17.9 | 17.5 | 17.0 | 15.0 | 12.2 | 16.0 |
| | 40 | 16.1 | 18.0 | 17.5 | 16.5 | 14.1 | 7.4 | 14.9 |
| | 45 | 15.9 | 18.0 | 17.1 | 16.1 | 13.5 | 6.0 | 14.4 |
| | 50 | 15.6 | 17.7 | 17.0 | 15.7 | 12.5 | 4.7 | 13.9 |
| | 55 | 15.2 | 17.8 | 17.3 | 15.6 | 12.7 | 2.5 | 13.5 |
| | 60 | 14.9 | 17.9 | 17.4 | 15.1 | 12.0 | 1.6 | 13.2 |
| | 65 | 15.2 | 16.3 | 17.9 | 15.1 | 12.1 | 0.6 | 12.9 |
| | 70 | 15.6 | 12.4 | 15.2 | 14.8 | 11.9 | 0.0 | 11.6 |
| | 75 | 15.3 | 10.5 | 13.5 | 14.9 | 12.2 | 0.0 | 11.0 |
| | 80 | 11.9 | 4.5 | 7.3 | 11.8 | 10.8 | 0.0 | 7.7 |
| | 85 | 4.8 | 0.2 | 0.1 | 5.3 | 6.0 | 0.0 | 0.7 |
| | 90 | 0.0 | 0.0 | 0.0 | 0.7 | 3.6 | 0.0 | 0.7 |
| | 95 | 0.0 | 0.0 | 0.0 | 0.0 | 0.0 | 0.0 | 0.0 |

A first row of Table 2 represents a decoded image that is generated from each of the test images (a) through (f) of FIG. 4, and a second column of Table 2 represents a compression ratio. The estimated strength of noise increases as contamination of an image while the image is compressed becomes more severe.

Figure 5:
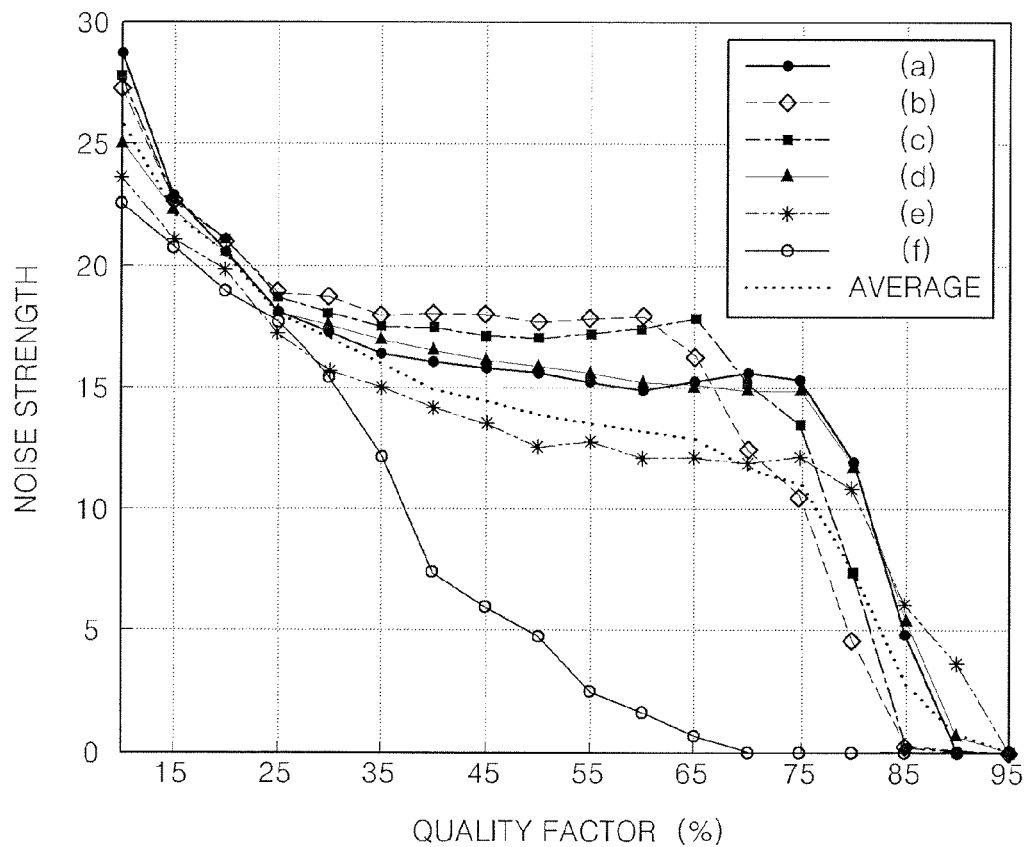
FIG. 5 is a graph showing nose strength according to estimated compression ratios in each of the six test images illustrated in FIG. 1.

FIG. 5 is a graph showing nose strength according to estimated compression ratios in each of the six test images illustrated in FIG. 1. Referring to FIG. 5, noise strength decreases rapidly after a compression ratio is greater than 75%, excluding the result of the test image (f) of FIG. 4. In general, it is considered that the compression ratio of 75% is appropriate to most images. Also, there is a little probability that a compressed image may indicate compressed noise due to a high quality factor.

Relatively large noise strength $Q_{rs}$ represents more severe compressed noise, and the estimated noise strength is relatively low compared to an image having large high frequency components, as shown from the result of the test image (f) of FIG. 4. Since human's eyes are more sensitive to low frequency than to high frequency when an image is uniformly contaminated, the noise reduction filter is applied to an image including a large amount of high frequency components, as in the image (f) of FIG. 4 so as to prevent damage of real components of the image.

A second experiment refers to estimation of the scale ratio. In the second experiment, the test image (a) of FIG. 4 is encoded by quality factors, such as $q_5$, $q_{25}$, and $q_{55}$, and bilinear interpolation is used to enlarge an image according to various scale ratios. It is more difficult to detect the scale ratio from an interpolation image obtained by bilinear interpolation compared to other interpolation methods. The result of estimating the scale ratio is shown in Table 3.

TABLE 3

|  |  | Real Scale Ratio | | | | | | | | |
|---|---|---|---|---|---|---|---|---|---|---|
| Image $q_x$ | | 1.000 | 1.125 | 1.250 | 1.375 | 1.500 | 1.625 | 1.750 | 1.875 | 2.000 |
| (a) | $q_5$ | P | P | P | P | P | P | P | P | P |
|  | $q_{25}$ | P | P | P | P | P | P | P | P | P |
|  | $q_{55}$ | P | P | P | P | P | F | F | F | F |

In Table 3, P and F respectively represent 'Pass' when the scale ratio estimated according to the present invention is the same as a real scale ratio, and 'Fail' when the scale ratio estimated according to the present invention is not the same as the real scale ratio. As shown in Table 3, according to the present invention, all scale ratios in images with high compression ratios can be easily estimated. However, when a high quality factor is used, it is difficult to estimate an exact scale ratio according to the present invention. This is because, when the high equality factor is used, the block boundary is not clear. Also, the block boundary is smoothed during interpolation. However, in this case, the scale ratio can be efficiently estimated using a pre-processing technique, such as an unsharp mask algorithm.

Figure 6:
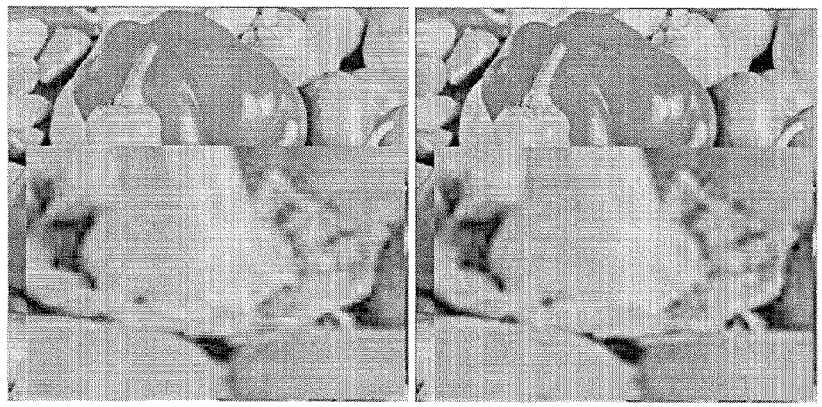
FIG. 6 is images obtained by encoding the image illustrated in (c) of FIG. 4 with a quality factor of $q_{35}$ and then by enlarging the image 1.25 times.

FIG. 6 is images obtained by encoding the image illustrated in (c) of FIG. 4 with a quality factor of $q_{35}$ and then by enlarging the image 1.25 times. The left image of FIG. 6 illustrates the result of applying the noise reduction filter without an operation of estimating the scale ratio according to the present invention, and the right image of FIG. 6 illustrates the result of applying the noise reduction filter after the operation of estimating the scale ratio according to the present invention is performed. When the position of the noise reduction filter is clearly determined by estimating the scale ratio according to the present invention, the performance of reducing noise of the image can be improved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

As described above, in the apparatus and method of estimating a scale ratio and noise strength of an encoded image according to the present invention, the scale ratio of the encoded image is estimated based on edge components extracted from the encoded image, and the position of a block boundary to which a noise reduction filter is to be applied, is determined based on the estimated scale ratio, and the strength of noise of the image is estimated to determine the strength of the noise reduction filter so that compressed noise, such as a block effect, included in the image can be efficiently reduced without advance information about the image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for estimating a scale ratio and noise strength of an encoded image, the apparatus comprising:
    a data storage devise;
    an edge detection unit generating an edge map including edge pixels selected based on sizes and consistency of high frequency components extracted from an input image, from among pixels of the input image obtained by encoding and decoding an original image via a block-based image compression technique;
    a projection histogram calculation unit calculating a horizontal histogram that indicates the number of edge pixels included in each column of the edge map, and a vertical histogram that indicates the number of edge pixels included in each row of the edge map;
    a distance histogram calculation unit calculating a distance histogram that is represented as the number of frequencies with respect to each of the horizontal histogram and the vertical histogram according to a size of a column distance that is a distance between two adjacent columns in which the column values are not 0 on a horizontal axis;
    a scale ratio estimation unit estimating a horizontal scale ratio and a vertical scale ratio of the input image with respect to the original image from the distance histogram calculated from each of the horizontal histogram and the vertical histogram based on the value of the column distance corresponding to the maximum number of frequencies;
    a block boundary determination unit determining a group including the maximum number of edge pixels from among a plurality of groups obtained by classifying a plurality of columns that constitute the edge map based on the horizontal scale ratio, and a group including the maximum number of edge pixels from among a plurality of groups obtained by classifying a plurality of rows that constitute the edge map based on the vertical scale ratio as a block boundary of the input image; and
    a noise strength estimation unit estimating strength of noise included in the input image based on edge information calculated from the group determined as the block boundary.

2. The apparatus of claim 1, wherein the edge detection unit determines a pixel in which the size of the high frequency component belongs to a predetermined range and the sign of the high frequency component is different from a sign of the high frequency component with respect to adjacent pixels, as the edge pixel.

3. The apparatus of claim 1, wherein the projection histogram calculation unit determines a value of a column having a smaller value than an average of values of columns included in each of the horizontal histogram and the vertical histogram, with respect to each of the horizontal histogram and the vertical histogram as 0.

4. The apparatus of claim 1, wherein, when a plurality of columns are included in the distance histogram, the scale ratio estimation unit estimates the scale ratio by using a weighted sum of a value of the column distance corresponding to the maximum number of frequencies and a value of the column distance corresponding to the second highest number of frequencies.

5. The apparatus of claim 4, wherein the weighted sum for estimating the scale ratio is determined according to a ratio of the value of the column distance corresponding to the maximum number of frequencies to the value of the column distance corresponding to the second highest number of frequencies.

6. The apparatus of claim 1, wherein the noise strength estimation unit calculates the edge information from a group determined as a vertical block boundary based on the horizontal scale ratio and a group determined as a horizontal block boundary based on the vertical scale ratio, respectively, and the edge information comprises an edge count that is the number of edge pixels that belong to the group determined as the block boundary, an edge ratio that is a ratio of the number of edge pixels that belong to the group including the second highest number of edge pixels from among a plurality of groups obtained by the block boundary determination unit with respect to a value of the edge count, and an edge value that is an average of sizes of high frequency components of the edge pixels that belong to the group determined as the block boundary.

7. The apparatus of claim 6, wherein the noise strength estimation unit estimates noise strength of the input image by using the following Equations A and B:

$$Q_{rs} = \left(1 - \lambda_{T_{cnt}^1}^{T_{cnt}^2}(h_{cnt})\right) \cdot \lambda_{T_{ratio}^1}^{T_{ratio}^2}(h_{ratio}) \cdot h_{val} \quad \text{(A)}$$

$$\lambda_{\tau_1}^{\tau_2}(\chi) = \begin{cases} 1 & \text{for } \chi < \tau_1 \\ \frac{1}{\tau_2 - \tau_1}(\chi - \tau_1) & \text{for } \tau_1 \leq \chi \leq \tau_2, \\ 0 & \text{for } \chi > \tau_2 \end{cases} \quad \text{(B)}$$

where $Q_{rs}$ is the estimated noise strength, and $h_{cnt}$ is the edge count, and $h_{ratio}$ is the edge ratio, and $N_{val}$ is the edge value, and $\tau_1$ and $\tau_2$ are a first threshold and a second threshold, which are determined in advance.

8. The apparatus of claim 1, further comprising a filtering unit reducing noise included in the input image by applying a noise reduction filter having a strength determined based on the estimated strength of noise to the position of the block boundary.

9. A method of estimating a scale ratio and noise strength of an encoded image, the method comprising:
generating an edge map including edge pixels selected based on sizes and consistency of high frequency components extracted from an input image, from among pixels of the input image obtained by encoding and decoding an original image via the block-based image compression technique;
calculating a horizontal histogram that indicates the number of edge pixels included in each column of the edge map, and a vertical histogram that indicates the number of edge pixels included in each row of the edge map;
calculating a distance histogram that is represented as the number of frequencies with respect to each of the horizontal histogram and the vertical histogram according to a size of a column distance that is a distance between two adjacent columns in which the column values are not 0 on a horizontal axis;
estimating a horizontal scale ratio and a vertical scale ratio of the input image with respect to the original image from the distance histogram calculated from each of the horizontal histogram and the vertical histogram based on the value of the column distance corresponding to the maximum number of frequencies;
determining a group including the maximum number of edge pixels from among a plurality of groups obtained by classifying a plurality of columns that constitute the edge map based on the horizontal scale ratio, and a group including the maximum number of edge pixels from among a plurality of groups obtained by classifying a plurality of rows that constitute the edge map based on the vertical scale ratio as a block boundary of the input image; and
estimating strength of noise included in the input image based on edge information calculated from the group determined as the block boundary.

10. The method of claim 9, wherein the generating of the edge map comprises determining a pixel in which the size of the high frequency component belongs to a predetermined range and the sign of the high frequency component is different from a sign of the high frequency component with respect to adjacent pixels, as the edge pixel.

11. The method of claim 9, wherein the calculating of the horizontal histogram and the vertical histogram comprises determining a value of a column having a smaller value than an average of values of columns included in each of the horizontal histogram and the vertical histogram, with respect to each of the horizontal histogram and the vertical histogram as 0.

12. The method of claim 9, wherein, when a plurality of columns are included in the distance histogram, the estimating of the horizontal scale ratio and the vertical scale ratio comprises estimating the scale ratio by using a weighted sum of a value of the column distance corresponding to the maximum number of frequencies and a value of the column distance corresponding to the second highest number of frequencies.

13. The method of claim 12, wherein the weighted sum for estimating the scale ratio is determined according to a ratio of the value of the column distance corresponding to the maximum number of frequencies to the value of the column distance corresponding to the second highest number of frequencies.

14. The method of claim 9, wherein the estimating of the strength of noise comprises calculating the edge information from a group determined as a vertical block boundary based on the horizontal scale ratio and a group determined as a horizontal block boundary based on the vertical scale ratio, respectively, and the edge information comprises an edge count that is the number of edge pixels that belong to the group determined as the block boundary, an edge ratio that is a ratio of the number of edge pixels that belong to the group including the second highest number of edge pixels from among a plurality of groups obtained by the block boundary determination unit with respect to a value of the edge count, and an edge value that is an average of sizes of high frequency components of the edge pixels that belong to the group determined as the block boundary.

15. The method of claim 14, wherein the estimating of the strength of noise comprises estimating noise strength of the input image by using the following Equations A and B:

$$Q_{rs} = \left(1 - \lambda_{T_{cnt}^1}^{T_{cnt}^2}(h_{cnt})\right) \cdot \lambda_{T_{ratio}^1}^{T_{ratio}^2}(h_{ratio}) \cdot h_{val} \quad \text{(A)}$$

$$\lambda_{\tau_1}^{\tau_2}(\chi) = \begin{cases} 1 & \text{for } \chi < \tau_1 \\ \frac{1}{\tau_2 - \tau_1}(\chi - \tau_1) & \text{for } \tau_1 \leq \chi \leq \tau_2, \\ 0 & \text{for } \chi > \tau_2 \end{cases} \quad \text{(B)}$$

where $Q_{rs}$ is the estimated noise strength, and $h_{cnt}$ is the edge count, and $h_{ratio}$ is the edge ratio, and $h_{val}$ is the edge value, and $\tau_1$ and $\tau_2$ are a first threshold and a second threshold, which are determined in advance.

16. The method of claim 9, further comprising reducing noise included in the input image by applying a noise reduction filter having a strength determined based on the estimated strength of noise to the position of the block boundary.

17. A non-transitory computer readable recording medium having recorded thereon a program for executing a method of estimating a scale ratio and noise strength of an encoded image, the method comprising:

generating an edge map including edge pixels selected based on sizes and consistency of high frequency components extracted from an input image, from among pixels of the input image obtained by encoding and decoding an original image via a block-based image compression technique;

calculating a horizontal histogram that indicates the number of edge pixels included in each column of the edge map, and a vertical histogram that indicates the number of edge pixels included in each row of the edge map;

calculating a distance histogram that is represented as the number of frequencies with respect to each of the horizontal histogram and the vertical histogram according to a size of a column distance that is a distance between two adjacent columns in which the column values are not 0 on a horizontal axis;

estimating a horizontal scale ratio and a vertical scale ratio of the input image with respect to the original image from the distance histogram calculated from each of the horizontal histogram and the vertical histogram based on the value of the column distance corresponding to the maximum number of frequencies;

determining a group including the maximum number of edge pixels from among a plurality of groups obtained by classifying a plurality of columns that constitute the edge map based on the horizontal scale ratio, and a group including the maximum number of edge pixels from among a plurality of groups obtained by classifying a plurality of rows that constitute the edge map based on the vertical scale ratio as a block boundary of the input image; and estimating strength of noise included in the input image based on edge information calculated from the group determined as the block boundary.

\* \* \* \* \*